Aug. 7, 1923.
J. B. HUNT
1,464,042
BAND SAW GUIDE
Filed July 6, 1921
2 Sheets-Sheet 1
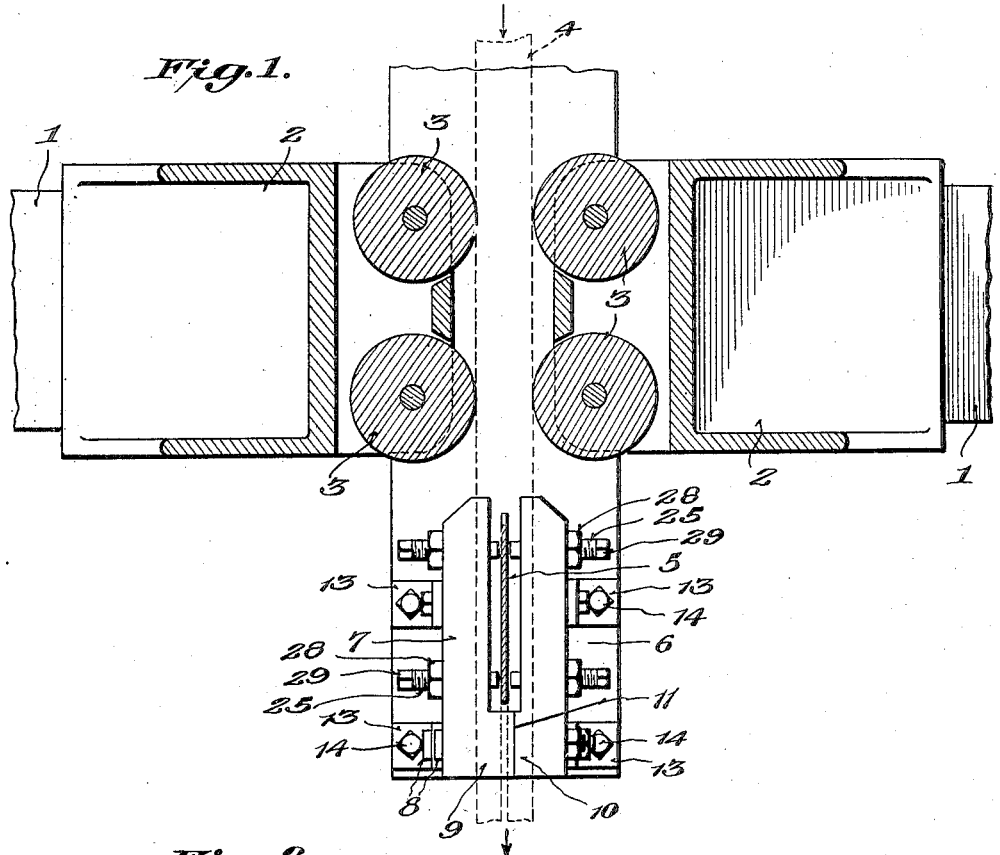
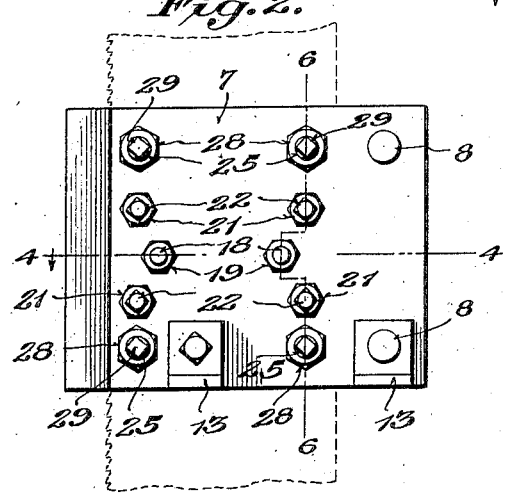
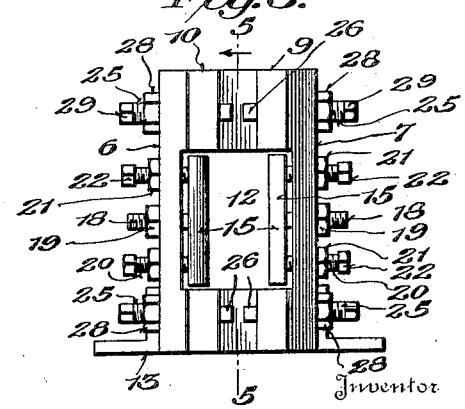
Inventor
J. B. Hunt,
WITNESS:—
Chas. L. Griesbauer
By Meyers, Cavanagh,
Whitehead & Hyde
Attorneys Aug. 7, 1923.

J. B. HUNT

BAND SAW GUIDE

Filed July 6, 1921

Inventor

J. B. Hunt,

Patented Aug. 7, 1923.

1,464,042

UNITED STATES PATENT OFFICE.

JAMES BOOTH HUNT, OF AVERA, MISSISSIPPI.

BAND-SAW GUIDE.

Application filed July 6, 1921. Serial No. 482,653.

*To all whom it may concern:*

Be it known that I, JAMES B. HUNT, citizen of the United States, and resident of Avera, in the county of Greene and State of Mississippi, have invented certain new and useful Improvements in Band-Saw Guides, of which the following is a specification.

My invention relates to a band saw guide, especially adapted for resaw machines in which a strip of lumber previously sawed or shaped is again sawed lengthwise, usually through the middle.

In resawing lumber in this way with band saws, it has been found to be especially difficult to make the cut exactly in the center of the strip, owing to lateral movements of the strip, due to warping, or to variations in the actions of the feed rolls, movement of the saw blade in relation to the true cutting line, and for other reasons.

My invention overcomes these difficulties by providing guiding means which act both upon the lumber and the saw band at points closely adjacent to the cut so that the lumber and saw are held in absolutely true relation to each other, regardless of warping or other peculiarities of the lumber, and the cut is, therefore, made in the true center of the strip throughout its length.

The characteristics and advantages of the invention are sufficiently explained hereafter in connection with the detailed description of the accompanying drawings, which show one exemplifying embodiment of the invention. After considering this it will be understood that many variations may be made within the principles of the invention, and I contemplate the employment of any structures which are within the scope of the appended claims.

In the drawing:

Fig. 1 is a horizontal section through part of the frame of one typical form of band saw machine in a plane above the table, showing a saw guide embodying the invention in position on the table in proper relation to the feed rolls and saw band.

Fig. 2 is a side elevation of the guide.

Fig. 3 is a front end elevation, that is looking from the left in Fig. 2.

Figure 4:
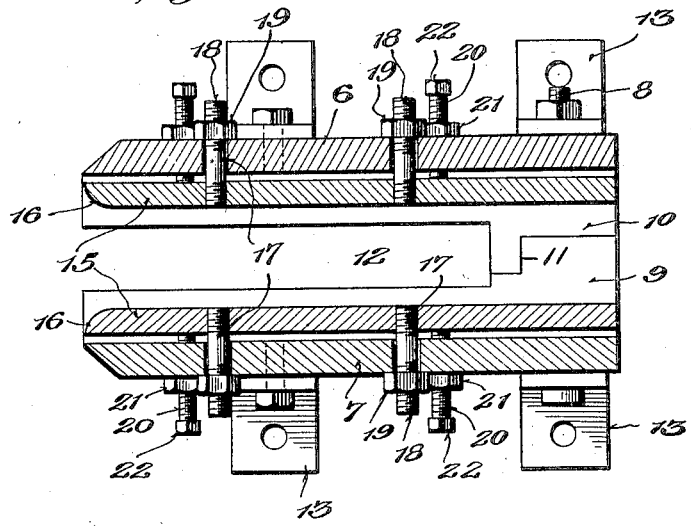
Fig. 4 is a horizontal section at 4—4, Fig. 2.
Figure 5:
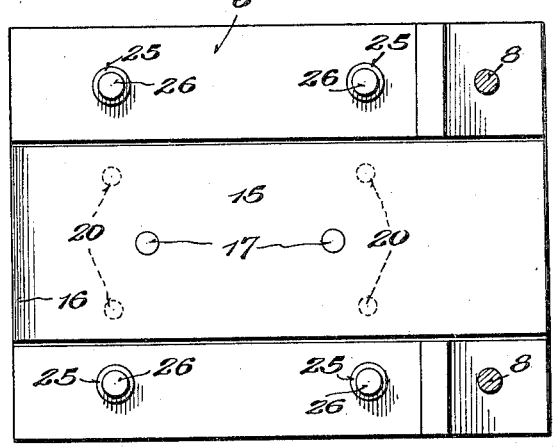
Fig. 5 is an elevation of one of the frame members and associated parts, the other frame member being removed.
Figure 6:
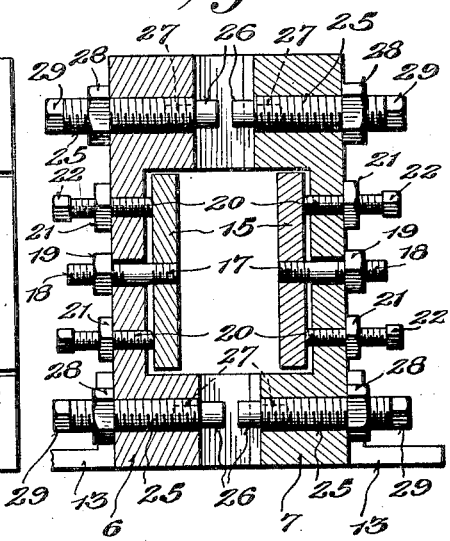
Fig. 6 is a transverse section at 6—6, Fig. 2.

The invention is shown as adapted to a vertical resaw machine in which the saw blade runs vertically, but it may be readily adapted to a horizontal machine by suitable changes in form and location of parts, as will be readily understood by persons familiar with machines of this class. Fig. 1 shows the table 1 of a vertical machine on which uprights or frame members 2 are adjustably mounted. These frame members carry the feed rolls 3 which are driven in any usual or suitable way. The strip of lumber 4 indicated in dotted lines is advanced by the feed rolls to the saw 5, of which only the descending vertical portion is shown in the different figures.

The table is provided with an extension 6 on which the guide is located. The body or frame-work of the guide may be variously formed, but conveniently consists, as shown in the present embodiment, of two blocks or frame members 7 secured together at their rear or outer ends by bolts 8 passing through upper and lower lugs 9 and 10 which have interfitting shoulder portions, as indicated at 11, to accurately locate the frame members in relation to each other. The lugs or enlargements 9 and 10 are spaced apart vertically to provide a central aperture 12 through which the lumber strip passes. The guide is secured to the table by angle pieces 13 secured to the frame members 7 and to the table by screws 14. Each of the vertical plates constituting the main portions of the frame members 7 is inwardly recessed to accommodate one of the two lumber guides 15. Each of these consists of a metal plate having a curved or beveled inward end 16 to easily direct the lumber strip between the guides. Each lumber guide plate is provided with retracting screws 17, usually a pair of them arranged in the horizontal center line of the plate and each of these screws is fixed in a guide plate and has a threaded portion 18 extending out beyond the frame plate 7 and nuts 19 screwed on these threaded portions and engaging against the frame plate serve to draw the guide plate outward. Each guide plate is also provided with other adjusting screws 20, usually two pairs, arranged in lines above and below the retracting screws. These adjusting screws 20 are threaded in the frame plates 7 and their inward ends engage against the outer faces of the guide plates and the screws are also provided with lock nuts 21 and polygonal heads 22 to receive a wrench. By loosening the nuts 19 and advancing the screws 20 the guide plates may be moved in to properly engage and center the particular piece of lumber to be resawed and then by tightening the nuts 19 the plates are held firmly against the ends of screws 20 and locked in position.

Saw guides are also provided consisting of screws 25 passing through threaded holes in the frame members 7. Desirably there are four of these screws in each of the side members arranged in pairs above and below the lumber guide plates, the screws on opposite frame members being in alinement with each other. At the inner end of each screw is a member of desirable form and material to engage and guide the saw plate, such for example, as wooden pegs or heads 26 having flat inner ends and having shanks 27 tightly inserted in sockets formed in the inward ends of the screws. The screws are secured by lock nuts 28 and have polygonal heads 29 to receive a wrench. The screws 25 may be adjusted in an obvious way to center the saw blade and to engage it with a proper running fit.

When the guide plates and saw guides are properly adjusted the saw and the advancing strip of lumber are held in absolutely true centered relation to each other and any divergence of cut from the true center line of the resawed strip is effectively prevented.

Evidently the two frame members or plates 7 are not necessarily connected to each other, but each of them may be properly secured to the table without mutual connection and such an arrangement is desirable in some cases to permit easier removal of the saw.

While the guide frame and guide members are usually arranged and adjusted so that the saw splits the lumber in the longitudinal center line to define a previously shaped piece of lumber, such as a ceiling strip, into two similar parts, evidently by properly arranging the guide frame on the saw table and by properly adjusting the guide members, the saw may cut the lumber along a line more or less to one side of the center and so divide the lumber into two unequal parts. The general arrangement for resawing, however, is such that the strip is divided through the center, as previously explained.

Many changes in addition to those previously mentioned may be made within the principles of the invention, as will be understood by persons skilled in the art, without detailed explanation.

I claim:—

1. An attachment for resaw machines, said attachment comprising as a substantially unitary detachable structure, lumber guides adapted to receive a strip of lumber between them and having sufficient length and width of engagement with the lumber to accurately guide it in straight longitudinal movement without lateral deviation, and saw guide means secured in definite relation to the lumber guide means and adapted to engage opposite sides of the band saw and guide the saw in definite relation to the lumber without lateral deviation or twisting, so that the lumber is split lengthwise without deviation from the true straight cutting line.

2. A unitary saw-and-lumber guide for a band resaw machine, comprising a guide frame, opposite lumber guide plates therein, and opposite saw guides in the frame to maintain the saw band in centered relation to a strip of lumber definitely located by the lumber guide plates.

3. A guide for a band resaw machine comprising frame members adapted to be bolted to the saw table in fixed relation to each other, the frame members providing a passageway for a lumber strip, opposite lumber guide plates adjustably secured in the frame members to guide and center the lumber strip, and opposite saw guides adjustably secured in the frame members and arranged to engage and center the saw band at points adjacent to the lumber guide plates.

4. A guide for a band resaw machine comprising frame plates, means for securing them in fixed relation to the saw table, opposite lumber guide plates located in recesses in the frame plates, screws for advancing the guide plates, and cooperative screws for retracting the guide plates, opposite saw guide members located above and below the guide plates, and means for adjusting the saw guide members.

5. The combination with the table, band saw and feed rolls of a band saw machine, of a guide frame secured to the table, lumber guide plates adjustably secured in the guide frame and arranged to receive and center a strip of lumber advanced by the feed rolls, and opposite saw guide members adjustably secured in the guide frame to center the saw band in relation to the guide plates and lumber strip.

6. In a band saw machine of a type including a table, a band saw and lumber feed rolls, the combination therewith of a guide frame, lumber guides therein distinct from said lumber feed rolls and having a sufficient length and width of engagement with the lumber to accurately guide it in straight longitudinal movement without lateral deviation, and saw guide means in said frame secured in definite relation to the lumber guide means and adapted to engage opposite sides of the band saw and guide the saw in definite relation to the lumber without lateral deviation so that the lumber is split lengthwise without deviation from the true straight cutting line.

7. In a saw guide for a band resaw machine, a guide frame including a base adapted to be secured to the saw table adjacent to the feed rolls and upright side members located at opposite sides of the saw band, opposite lumber guide plates located in said members, and opposite saw guides in said side members to maintain the saw band in centered relation to a strip of lumber definitely located by the lumber guide plates.

8. A guide for a band resaw machine comprising frame members adapted to be bolted to the saw table in fixed relation to each other, the frame members providing a passageway for a lumber strip, opposite lumber guide plates adjustably secured in the frame members to guide and center the lumber strip, opposite saw guide members adjustably secured in the frame members and separate end pieces carried by said members and arranged to engage and center the saw band at points adjacent to the lumber guide plates.

9. A guide for a band resaw machine comprising frame plates, means for securing them in fixed relation to the saw table, opposite lumber guide plates located in recesses in the frame plates, screws for advancing the guide plates, and cooperative screws for retracting the guide plates, and opposite saw guide screws threaded in the frame plates above and below the guide plates.

10. A guide for a band resaw machine comprising frame plates, means for securing them in fixed relation to the saw table, opposite lumber guide plates located in recesses in the frame plates, screws for advancing the guide plates, and cooperative screws for retracting the guide plates, and opposite saw guide screws threaded in the frame plates above and below the guide plates, said saw guide screws being provided with inner end sockets, and saw guide plugs inserted in said sockets.

11. The combination with the table, band saw and feed rolls of a band saw machine, of a guide frame secured to the table, lumber guide plates adjustably secured in the guide frame and arranged to receive and center a strip of lumber advanced by the feed rolls, and opposite saw guide screws threaded in the guide frame, to center the saw band in relation to the guide plates and lumber strip.

Signed at Avera, in the county of Greene and State of Mississippi, this 30th day of June, A. D. 1921.

JAMES BOOTH HUNT.